United States Patent [19]
Seel

[11] Patent Number: 5,789,885
[45] Date of Patent: Aug. 4, 1998

[54] ELECTRIC MOTOR WITH FIELD-CURRENT-GENERATED MAGNETIC-FIELD BRAKE

[75] Inventor: Ottmar Seel, Leinfelden-Echterdingen, Germany

[73] Assignee: Robert Bosch GmbH, Stuttgart, Germany

[21] Appl. No.: 619,759

[22] PCT Filed: Sep. 28, 1994

[86] PCT No.: PCT/DE94/01147
§ 371 Date: May 28, 1996
§ 102(e) Date: May 28, 1996

[87] PCT Pub. No.: WO95/09477
PCT Pub. Date: Apr. 6, 1995

[30] Foreign Application Priority Data

Sep. 30, 1993 [DE] Germany ............ 43 33 294.3

[51] Int. Cl.⁶ .................................................. H02P 3/00
[52] U.S. Cl. .......................................... 318/375; 318/123
[58] Field of Search ................ 318/362, 365–382, 318/434, 269, 123, 276; 361/23, 33

[56] References Cited

U.S. PATENT DOCUMENTS

| | | |
|---|---|---|
| 4,054,821 | 10/1977 | Williamson .................. 318/375 |
| 4,112,341 | 9/1978 | Fath et al. ................... 318/370 |
| 4,144,482 | 3/1979 | Schwab ....................... 318/381 |
| 4,145,641 | 3/1979 | Ozaki .......................... 318/269 |
| 4,423,363 | 12/1983 | Clark et al. ................. 318/375 |
| 4,514,677 | 4/1985 | Kaufman et al. ............ 318/759 |
| 5,036,234 | 7/1991 | Friedrich et al. . |
| 5,099,184 | 3/1992 | Hornung et al. ............ 318/375 |
| 5,294,874 | 3/1994 | Hessengerger ........... 318/375 X |
| 5,315,221 | 5/1994 | Corey .......................... 318/434 |
| 5,517,093 | 5/1996 | Augustyniak et al. ..... 318/375 X |

FOREIGN PATENT DOCUMENTS 35 39 841  3/1987  Germany .
37 39 623  7/1988  Germany .

Primary Examiner—Jonathan Wysocki
Attorney, Agent, or Firm—Kenyon & Kenyon

[57] ABSTRACT

An electric motor with an electrodynamic braking means, where the same power controller is used in both motor operation and in braking. Therefore, the field current with the separately excited electric motor can be controlled or regulated by the power controller. It is also possible to preset a certain braking time. A measure of the braking current is obtained by sensing the voltage at a braking resistor, so the braking current can also be regulated on the basis of the field current.

17 Claims, 3 Drawing Sheets

5,789,885

1

ELECTRIC MOTOR WITH FIELD-CURRENT-GENERATED MAGNETIC-FIELD BRAKE

FIELD OF INVENTION

The present invention relates to an electric motor with an electrodynamic brake and with a controller that controls the motor current or motor speed by way of a power controller unit.

BACKGROUND INFORMATION

German Patent No. 3/539/841 C2 has already disclosed a braking means for a series motor, where the polarity of the field coil is reversed in the braking mode and the field coil is connected in series with the armature across a solid-state switching device. In motor operation, however, the power semiconductor device has practically no effect because it forms a separate circuit from the motor. If this is to be a variable speed motor, another power controller unit would be necessary for the controller. The circuitry required for braking and motor operation of the electric motor is relatively complicated because of the two power controllers that must be used.

SUMMARY OF THE INVENTION

The electric motor according to an embodiment of the present invention has the advantage that the same power controller can be used in both motor operation and in the braking mode. It is especially advantageous that this double use of the power controller not only reduces the circuitry but also makes it possible to eliminate an additional heat sink. As a rule, a heat sink takes up a lot of space and therefore is not desirable.

It is also advantageous for the power controller to control the field current that creates the magnetic field in braking. The braking current can be controlled to advantage by the control input of the power controller. This is preferably accomplished by designing the controller 5 as a phase controller, which is provided anyway for the purpose of speed control in motor operation.

Due to the controller that is provided for the braking current, the braking time for braking the motor, which may be connected to a cutting tool or a saw, can be preset. Especially with circular saws, hedge clippers and lawnmowers, it is desirable to brake the running tool very quickly in order to minimize the risk of injury to the operator.

It is also advantageous for the controller to have devices for measuring the braking current for example, a voltmeter to measure the voltage, or an ampmeter to measure the current as is known in the art. An example of such a device is shown schematically as 16 in FIG. 4. With the help of these devices, the field current can be kept constant over the entire braking operation or adapted to a given curve to keeping the braking current constant, preferably over the entire braking operation, is desirable in order to avoid high current peaks when initiating the braking operation. These current peaks cause extreme brush sparking, which in turn causes excessive and irregular wear on the carbon brushes. This results in relatively gentle braking of the electric motor or hand tool.

It is also advantageous for a first change-over switch to be used to direct the motor current through the power controller in motor operation or to reverse the field coil or parts thereof when braking, so the field current can generate the braking magnetic field.

2

In addition, a current limiting resistor is also provided in the field circuit (2,6,7,3,4) to avoid overloading the field coils. Likewise, a braking resistor can also be provided in the armature circuit for the braking operation. This permits separate adjustment of both the field current and the braking current.

Another application of the electric motor according to the present invention is in an electric hand tool, where the tool should be braked as quickly as possible to prevent the danger of injury. This is desirable with a saw, a grinder, a lawnmower, etc.

DETAILED DESCRIPTION OF THE INVENTION

Figure 1:
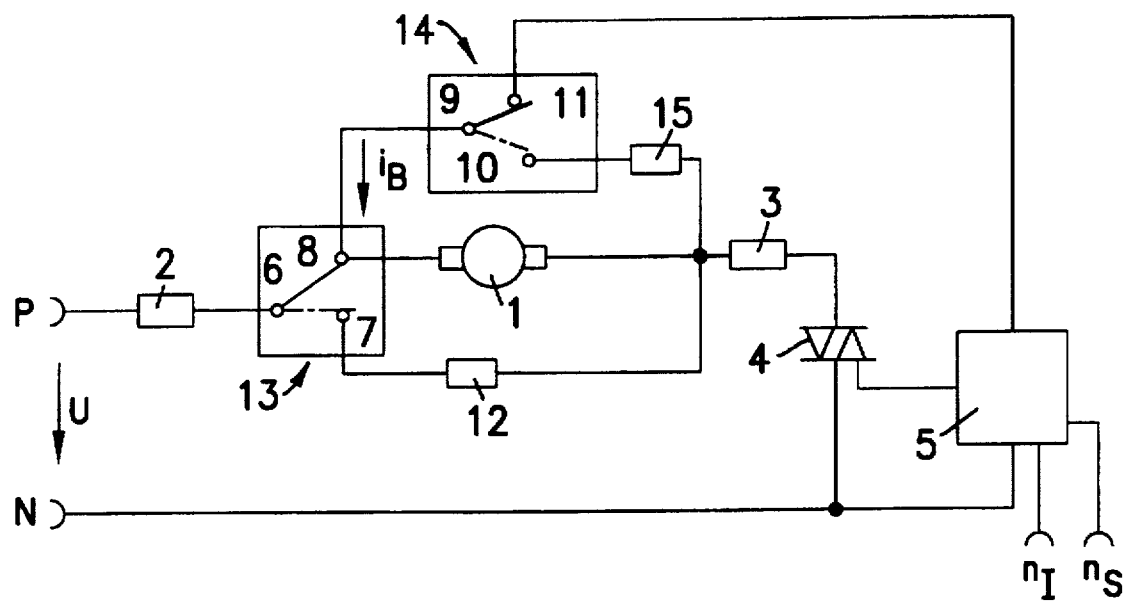
FIG. 1 illustrates a block schematic of a first embodiment according to the present invention.

FIG. 1 shows a first electric motor with an armature 1, a first field coil 2 and a second field coil 3 connected in series. A first change-over switch 13 is provided between the first field coil 2 and armature 1, and contacts 6, 8 are closed in motor operation. The second field coil 3 is connected to a line terminal N via a power controller 4, preferably a triac, a bidirectional triode thyristor or a thyristor. The first field coil 2 is connected to a second line terminal P. The control input of power controller 4 is connected to a controller 5, which is also connected to line conductor N. Controller 5 has additional inputs for the actual speed $n_I$ measured and the set speed $n_S$. In addition, controller 5 is connected to a second change-over switch 14, which detects the voltage on armature 1 across closed second contacts 9, 11 in motor operation. When braking, first contact 9, 10 is closed and thus a braking resistor 15 is connected in parallel with armature 1. It may also be advantageous to use a diode that rectifies the braking current as braking resistor 15, because the diode will allow only a half-wave to pass through. On the other hand, an ohmic resistor 15 would have the advantage that it would act as a fuse if controller 4 (triac) is short-circuited.

This design may be based on the field current and the braking current. Since second contact 9, 11 of the second change-over switch 14 is open, the control input of controller 5 does not receive a signal. Therefore, controller 5 can recognize whether motor operation or braking is occurring.

If the actual speed is not detected directly, the armature voltage in motor operation can also be used as a control parameter here (contact 9/11 closed).

The third change-over contact 6, 7 of the first change-over switch 13 is also connected in parallel with armature 1 via a current limiting resistor 12. Current limiting resistor 12 may have a certain value, preferably a value of 0 ohm.

Controller 5 is designed as a phase controller and is described in German Patent No. 3 739 623, for example. However, any other suitable controller 5 may also be used as power controller 4.

The operation of this circuit is described below. In motor operation, fourth contact 6, 8 of first change-over switch 13 is closed and second contact 9, 11 of the second change-over switch 14 is also closed. Then line voltage U is applied to the electric motor via terminal P, N. The current then flows back over the second line terminal N through first field coil 2, armature 1, second field coil 3 and power controller 4. Then the speed preset by a control element via input ns, for example, can be maintained by controller 5. The actual speed is picked up by a tachometer of a motor shaft, for example, and sent to input n, of controller 5 so that controller can compare the set speed with the actual speed. This normal motor operation is known per se. In addition, controller 5 picks up the armature voltage across closed second contact 9, 11 of the second change-over switch 14 and it thus receives information regarding motor operation or braking.

The motor is excited separately from the line when braking. When switching to braking mode, third contact 6, 7 (dotted line) of the first change-over switch 13 is closed, or first contact 9, 10 (dotted line) of the second change-over switch 14 is closed. The field current then flows from line terminal P through first field coil 2, optionally current limiting resistor 12 and the second field coil 3 as well as power controller 4. The magnetic field for creating the braking torque is generated with the field current. In addition, the braking current, which is determined essentially by braking resistor 15, flows through armature 1 and braking resistor 15 as well as first contact 9, 10. The controller detects via open second contact 9, 11 the fact that braking mode has been initiated, and it preselects the field current to achieve a certain braking torque. In braking, the field current is a pulsating d.c. current, where every second half-wave is preferably triggered by a microcomputer. The value for the field current, its preset characteristic, where the field current can be varied with time, or it can also be kept constant, is stored in a memory (not shown). In the simplest case, a comparator may also be used to select a default value for the field current. A timing element (not shown) such as a monoflop is also provided for setting a maximum braking time. The braking time is selected so the electric motor will stop safely. Accordingly, the maximum field current or a corresponding voltage that can be detected with a tachometer (not shown) can be preset for the braking current for a certain period of time. After the preset time has elapsed, the current flow in field coil 2, 3 is interrupted, so the braking action subsides because of the lack of current.

The duration of the braking operation can also be detected by means of the tachometer and thus the duration of the braking current can be controlled.

Figure 2:
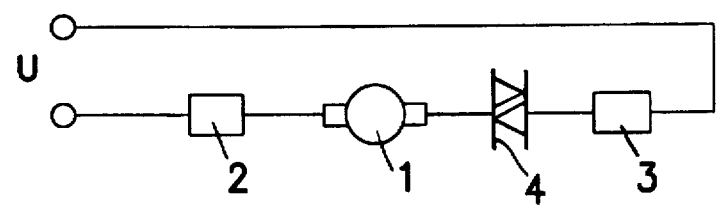
FIG. 2 illustrates a second embodiment according to the present invention.

In another embodiment of the present invention, the voltage, which is a measure of the braking current, can be measured across braking resistor 15. Therefore the braking current can be regulated especially easily with the help of the field current. It is especially easy to measure the braking current when the field coils are connected asymmetrically, in other words, when control element 4 is wired between armature 1 and a field coil 2, 3 according to FIG. 2.

Figure 3:
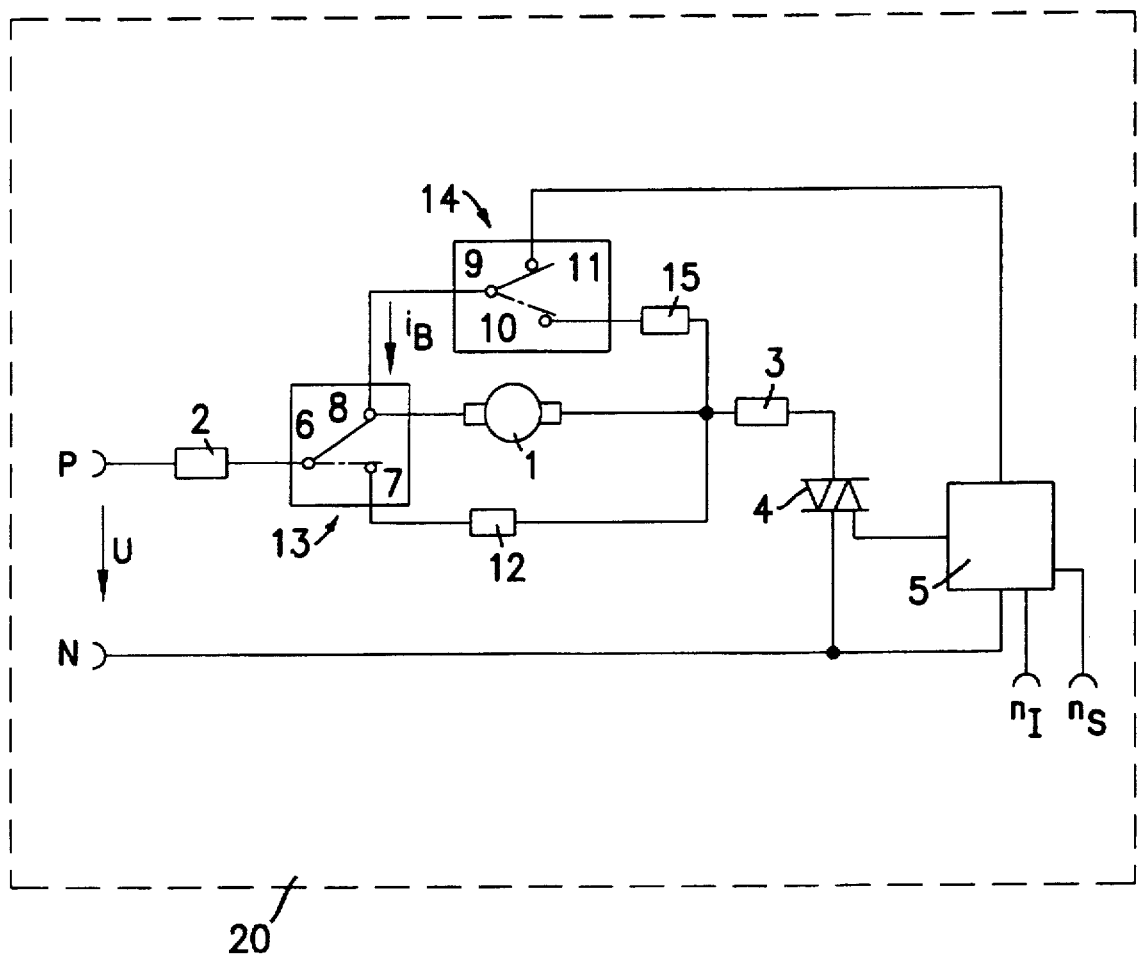
FIG. 3 schematically illustrates a device powered by an electric motor which may be, for example, a hand tool, a grinder, a saw, a lawnmower.
Figure 4:
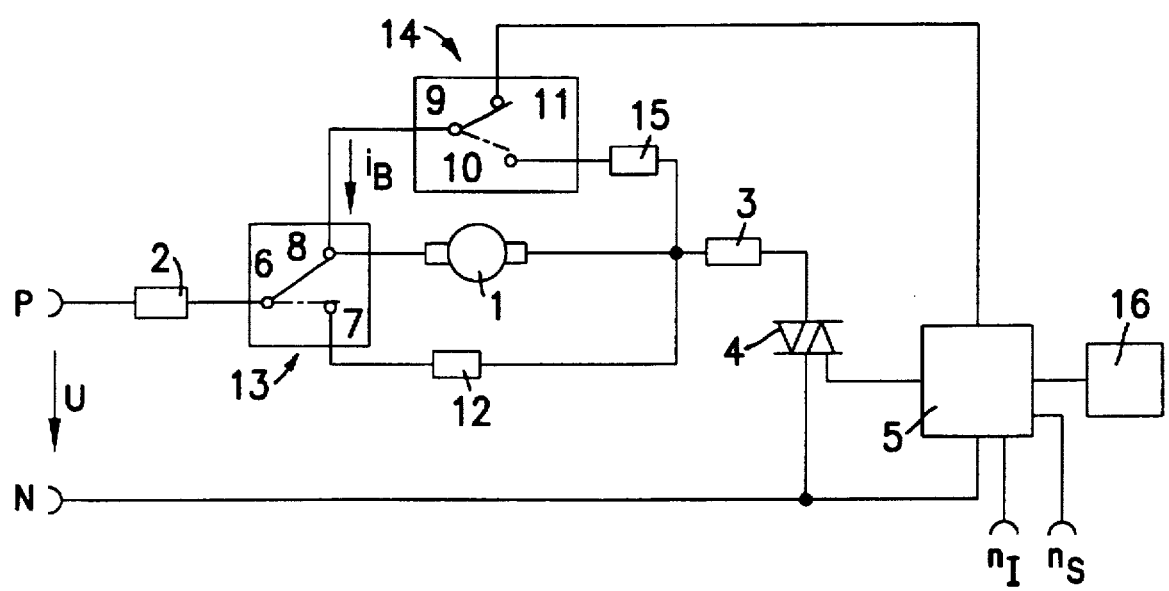
FIG. 4 illustrates a block schematic of an embodiment of the present invention.

In another embodiment of the present invention, the electric motor is used to power an electric device. This embodiment is shown schematically in FIG. 3. The electric device is shown at 20 and may be, for example, a hand tool, a grinder, a saw, or a lawnmower.

I claim:

1. An electric motor having an electrodynamic brake and being coupled to a line terminal, the electric motor comprising:

a first change-over switch;

an armature coupled to the first change-over switch;

a power controller coupled to the armature and having a first input and a second input, wherein signals for controlling the power controller are supplied to the power controller via the second input, and wherein the power controller regulates one of a motor current and a motor voltage during a motor operation mode and a motor braking mode;

a controller having a third input and a fourth input, wherein signals for controlling the controller are supplied to the controller via the fourth input, and wherein the controller is coupled in series with the power controller via the second input;

a second change-over switch having a first contact and a second contact, the second change-over switch being coupled in parallel with the armature; and wherein the first contact of the second change-over switch is opened during the motor operation mode and closed during the motor braking mode and the second contact of the second change-over switch is closed during the motor operation mode and open during the motor braking mode, and wherein the second contact of the second change-over switch couples the fourth input to the line terminal.

2. The electric motor as recited in claim 1, wherein the controller includes a phase controller for regulating a field current.

3. The electric motor as recited in claim 2, wherein the field current is regulated during the motor braking mode via the control input of the power controller.

4. The electric motor as recited in claim 3, wherein the controller regulates a braking current.

5. The electric motor according to claim 4, wherein the controller regulates the braking current for a predetermined maximum braking time.

6. The electric motor as recited in claim 4, wherein the controller includes means for measuring the braking current.

7. The electric motor as recited in claim 6, wherein after the controller measures the braking current, the controller maintains the braking current as constant.

8. The electric motor as recited in claim 7, wherein the controller includes means for setting the field current in order to maintain the braking current constant.

9. The electric motor as recited in claim 1, further comprising a field coil coupled to the first change-over switch, wherein the first change-over switch includes a third contact and a fourth contact, wherein the third contact is coupled in parallel to the armature, and the fourth contact is coupled to the armature.

10. The electric motor as recited in claim 9, wherein during motor braking mode, the first change-over switch electrically separates the field coil from the armature and connects the field coil in series with a field circuit including the power controller, the field coil and the third contact.

11. The electric motor as recited in claim 10, wherein the field circuit further includes a current limiting resistor.

12. The electric motor as recited in claim 9, wherein an armature circuit including the armature and the second contact further includes a braking resistor.

13. The electric motor as recited in claim 1, wherein the electric motor is used in an electric hand tool.

14. The electric motor as recited in claim 13, wherein the electric hand tool is a saw.

15. The electric motor as recited in claim 13, wherein the electric hand tool is a grinder.

16. The electric motor as recited in claim 13, wherein the electric hand tool is a lawnmower.

17. An electric motor having an electrodynamic brake, the electric motor comprising:

a first change-over switch;

an armature coupled to the first change-over switch;

a power controller coupled to the armature and having a first input and a second input, wherein signals for controlling the power controller are supplied to the power controller via the second input, and wherein the power controller regulates one of a motor current and a motor voltage during a motor operation mode and a motor braking mode;

a controller having a third input and a fourth input, wherein signals for controlling the controller being supplied to the controller via the fourth input, and wherein the controller is coupled in series with the power controller via the second input;

a second change-over switch having a first contact and a second contact, the second change-over switch being coupled in parallel with the armature; and wherein the first contact of the second change-over switch is opened during the motor operation mode and closed during the motor braking mode.

* * * * *

UNITED STATES PATENT AND TRADEMARK OFFICE
CERTIFICATE OF CORRECTION

PATENT NO. : 5,789,885
DATED : Aug. 4, 1998
INVENTOR(S) : Ottmar Seel

It is certified that error appears in the above-identified patent and that said Letters Patent is hereby corrected as shown below:

Column 1, line 13, "3/539/841 C2" should be --35 39 841--;

Column 2, line 62, "3 739 623" should be --37 39 623--;

Column 3, line 5, "ns" should be -- $n_s$ -- and

Column 3, line 8, "n," should be -- $n_1$ --.

Signed and Sealed this

Tenth Day of August, 1999

Attest:

Q. TODD DICKINSON

*Attesting Officer*  Acting Commissioner of Patents and Trademarks